United States Patent [19]

Parham et al.

[11] Patent Number: 4,787,976
[45] Date of Patent: Nov. 29, 1988

[54] NON-ADSORPTIVE, SEMIPERMEABLE FILTRATION MEMBRANE

[75] Inventors: Marc E. Parham, Sharon; Karen E. Milligan, Lowell, both of Mass.

[73] Assignee: W. R. Grace & Co.-Conn., New York, N.Y.

[21] Appl. No.: 728,008

[22] Filed: Apr. 29, 1985

[51] Int. Cl.$^4$ ............................................. B01D 13/00
[52] U.S. Cl. ............................ 210/500.23; 210/500.3; 210/500.41; 210/500.43; 264/41
[58] Field of Search ............ 210/490, 651, 654, 500.43, 210/500.41, 500.42, 500.23, 500.3; 264/41, 182

[56] References Cited

U.S. PATENT DOCUMENTS

| | | | |
|---|---|---|---|
| 3,691,068 | 9/1972 | Cross | 210/22 |
| 4,177,150 | 12/1979 | Inoue et al. | 210/500.43 |
| 4,332,686 | 6/1982 | Gerlach et al. | 210/651 |
| 4,575,539 | 3/1986 | DeCrosta et al. | 525/283 |
| 4,613,440 | 9/1986 | Zupancic et al. | 210/490 |

FOREIGN PATENT DOCUMENTS 849155 9/1960 United Kingdom .
951549 3/1964 United Kingdom .
1506472 4/1978 United Kingdom .

*Primary Examiner*—Frank Spear
*Attorney, Agent, or Firm*—Stacey L. Channing; Jill H. Krafte

[57] ABSTRACT

Disclosed is a protein non-adsorptive semipermeable filtration membrane and a process for producing the same. Said membrane, which comprises an interpenetrating polymer network, is prepared from a casting solution comprising a prepolymer polymerizable upon contact with a coagulating liquid, a polymer that will not react readily with the prepolymer and that is substantially insoluble in said coagulating liquid, and solvent.

41 Claims, No Drawings

NON-ADSORPTIVE, SEMIPERMEABLE FILTRATION MEMBRANE

BACKGROUND OF THE INVENTION

This invention relates to a protein non-adsorptive semipermeable filtration membrane and to a process for producing the same, and more particularly to a substantially protein non-adsorptive, semipermeable, filtration membrane comprising an interpenetrating polymer network which is prepared from a casting solution comprising a substantially protein non-adsorptive prepolymer polymerizable upon contact with the coagulating liquid employed in the production of the membrane, a polymer that will not react readily with the prepolymer and that is substantially insoluble in said coagulating liquid, and solvent.

Successful membrane controlled separation processes depend, in major part, upon the characteristics of the membrane utilized. Among the desired characteristics is high fouling resistance. Membranes tend to gather dissolved and suspended matter on their surfaces. The foulants include small particles, colloids, oil droplets and microorganisms. Many of these are hydrophobic, that is, in aqueous solution they recoil from water molecules and cluster together. These aggregates coat a membrane's surface and can clog its pores. For example, ultrafiltration membranes prepared from hydrophobic polymers and used to concentrate aqueous protein solutions become fouled by a buildup of a protein layer on the membrane surface. This fouling results in substantial loss of protein solute permeability relative to the permeability as measured in pure water.

Many current reverse osmosis separation systems employ a series of prefilters aided by injected coagulants and various chemicals to reduce membrane fouling. Because membranes seen to foul no matter how much the feed is pretreated, the systems also rely on regular cleansing of the membranes with oxidants, solvents and detergents. Such systems can also be backwashed under pressure. Imparting a specific electric charge to membranes has also been used to prevent fouling. In ultrafiltration and reverse-osmosis membranes, a change may serve to prevent the adsorption of particles that clog the membrane's pores. Another answer to reducing fouling which has been advocated is crossflow feed, which is the rapid passage of the feed solution under pressure past the membrane. It imparts turbulence and shear to the flow, which scours the membrane surface clean. The above-mentioned methods of preventing membrane fouling are far from perfect and can prove to be quite costly and time consuming.

Accordingly, it is a principal object of the present invention to provide an effective, efficient and relatively inexpensive method of preventing membrane fouling.

It is a further object of the present invention to provide such a method of preventing membrane fouling by providing a protein-nonadsorptive semipermeable filtration membrane which will not encounter fouling due to the protein-nonadsorptive nature of its surface.

SUMMARY OF THE INVENTION

The problems of the prior art have been overcome by the discovery of a new type of semipermeable, anisotropic, filtration membrane which is non-fouling due to the protein non-adsorptive nature of its surface. Said membrane, which comprises an interpenetrating polymer network, is prepared from a casting solution comprising a substantially protein non-adsorptive prepolymer polymerizable upon contact with the coagulating liquid employed in the production of the membrane, preferably a hydrophilic, isocyanate capped polyethylene glycol urethane prepolymer; a substantially coagulating liquid-insoluble polymer that will not react readily with the prepolymer, preferably an acrylonitrile-vinyl chloride copolymer or polysulfone, and organic solvent. The casting solution also preferably contains a pore forming agent such as formamide which is a cosolvent for the organic solvent.

DETAILED DESCRIPTION OF THE INVENTION

In accordance with this invention, a solubility protein non-adsorptive, semipermeable filtration membrane comprising an interpenetrating polymer network is provided. Said membrane is prepared from a casting solution comprising a prepolymer polymerizable upon contact with a coagulating liquid, a polymer that will not react readily with the prepolymer and that is substantially insoluble in said coagulating liquid, and solvent. The term "a coagulating liquid" as used herein refers to a liquid which upon contact with the casting solution of the invention causes the prepolymer and the polymer to precipitate.

The membrane of the invention may be formed as a flat sheet or as a tubular or hollow fiber, or in any other desired shape used for separation processes such as reverse osmosis, gas separation, ultrafiltration or microfiltration.

One way of enabling the finished membrane to be protein non-fouling is to use a protein non-adsorptive prepolymer as the prepolymer in the membrane casting solution. A membrane surface which does not adsorb protein will not be subject to the fouling problem since the proteinaceous layer does not adhere to the surface. Any protein non-adsorptive prepolymer which is polymerizable upon contact with the coagulating liquid employed in the production of the membrane can be used in the casting solution, although the preferred prepolymer is an isocyanate capped urethane prepolymer, which is liquid at room temperature or soluble in a suitable organic solvent. The preferred isocyanate capped urethane prepolymer is a hydrophilic, isocyanate capped polyethylene glycol urethane prepolymer which can optionally have an average isocyanate functionality greater than two, as taught in U.S. Pat. No. 4,137,200, the teachings of which are incorporated herein. Urethane prepolymers, rather than urethane polymers, are used in this invention since it is not possible to prepare a membrane from the preformed urethanes, in all instances, due to the poor solubility of the urethane in acceptable solvents.

One extensive class of isocyanate-capped urethane prepolymers that can be used in the invention comprises the isocyanate-capped polyesters. Such prepolymers may be made by condensing a polyhydric alcohol with a polycarboxylic acid to form a linear polyester which is then reacted with a slight molar excess of a polyisocyanate to provide an essentially linear polyurethane having terminal isocyanate groups and having an average molecular weight within the range 100 to 20,000. Polyhydric alcohols that can be used in preparing such prepolymers include the polyalkylene glycols such as ethylene, propylene and butylene glycol and polymethylene glycols such as tetramethylene and hexamethylene glycols. Among the useful polyisocyanates are aliphatic, aromatic or aliphatic-aromatic isocyanates such as butylene diisocyanate; ethylidine diisocyanate; ethylene diisocyanate; propylene 1,2-diisocyanate; tetramethylene diisocyanate; hexamethylene diisocyanate; 4,4'-diphenyl diisocyanate; 4,4'-diphenylene methane diisocyanate; diansidine diisocyanate; 1,4- and 1,5-naphthalene diisocyanate; 4,4'-diphenyl ether diisocyanate; m- and p-phenylene diisocyanate; 4,4'-toluidene diisocyanate; 1,4-xylylene diisocyanate; phenylethylene diisocyanate; the 2,4-; 2,5; and 2,6; 3,5-toluene diisocyanates; 1,3-cyclopentylene diisocyanate; 1,2-cyclohexylene diisocyanate; 1,4-cyclohexylene diisocyanate; 1,4-cyclohexane diisocyanate; chloro diphenyl diisocyanate; 4,4',4"-triphenyl methane triisocyanate; 1,3,5-triisocyanato benzene; 2,4,6-triisocyanato benzene and 4,4'-dimethyl-diphenyl methane-2,2',5,5' tetraisocyanate.

Another class of isocyanate capped urethane prepolymers that can be used in the invention comprise the isocyanate capped polyethers. These prepolymers can be made by reacting, for example, polyalkylene glycols with diisocyanates of the type listed above to provide a polyurethane having thermal isocyanate groups and having an average molecular weight within the range 100 to 20,000.

When the membrane of the invention is formed as a flat sheet, the casting solution comprises from 1–50%, more preferably 1–25%, and most preferably 3–6% by weight urethane prepolymer. When the membrane of the invention is formed as a hollow fiber, the casting solution comprises from 1–50%, more preferably 5–25%, and most preferably 8–12% by weight urethane prepolymer. The more urethane prepolymer in the casting solution, the lower the inherent hydrolic permeability of the membrane. Thus, when making an ultrafiltration membrane, one would prefer not to exceed a specific level of urethane prepolymer in the casting solution.

Also included in the membrane casting solution is polymer that will not react readily with the prepolymer and which is substantially insoluble in the coagulating liquid employed in the production of the membrane. The preferred reason for including such a polymer is in order to provide the membrane with inherent tensile strength. This polymer can be any substantially coagulating liquid-insoluble polymer which is suitable for forming membranes, e.g. hollow-fiber or flat sheet, and which will not react readily with the prepolymer, i.e. the viscosity of the casting solution will not change over a period of 12 to 24 hours. Examples of polymers which can be used are acrylonitrile-vinyl chloride copolymer, polysulfone and cellulose acetate. When the membrane of the invention is formed as a hollow fiber, the casting solution comprises from 2–50%, more preferably 5–25%, and most preferably 10–15% by weight of said substantially coagulating liquid-insoluble polymer. When the membrane of the invention is formed as a flat sheet and support for the membrane is not as crucial, the casting solution comprises from 0–15% by weight of said substantially coagulating liquid-insoluble polymer. Depending on the particular polymer used and the concentration of said polymer, different average pore sizes can be achieved.

Any solvent which does not react readily with the prepolymer may be employed in the casting solution. The solvent is preferably organic and may include, among others, N-Methylpyrrolidinone, N,N dimethylacetamide, methanol, acetone, dimethyl formamide, and 4-hydroxybutyric acid γ-lactone.

A pore forming agent, which is a cosolvent for the solvent employed, may optionally be included in the membrane casting solution. The membrane casting solution comprises from 0–20%, more preferably 0–10%, and most preferably 4–6% by weight of said pore forming agent, such as formamide.

An anisotropic flat sheet filtration membrane of the invention may be prepared by (1) casing a solution comprising a substantially protein non-adsorptive prepolymer, a polymer that will not react readily with the prepolymer, and solvent on a support; (2) immersing the supported film in a coagulation bath comprising a coagulating liquid with which the protein non-adsorptive prepolymer is polymerizable upon contact and which is a non-solvent for the polymer and prepolymer; and (3) recovering the membrane. Optionally, the casting solution further comprises a pore forming agent. Preferably, the polymer layer formed on the support is gelled before the supported film is immersed in the coagulation bath. Practical times of immersion in the coagulation bath depend upon the temperature and concentration of the bath. The supported film is preferably immersed in the coagulation bath for between 5 seconds and 60 minutes. When the coagulation is complete, usually within these time limits, the membrane separates from its support.

The support used to form the film can be of varied nature and shape. Suitable supporting substances include glass, metal and synthetic fiber cloth. The support can also be covered with a reinforcement intended to reinforce the membrane. The shape of the supporting substance can be a plate or any other suitable shape depending on the shape which it is desired to give to the membrane.

Between the stages of casting the film and immersing it in the coagulation bath, the film may be gelled; the term "gelling" denoting the conversion of the layer of polymer solution into a non-fluid state in the absence of stress. Various means can be used in order to bring about this gelling. It is possible to achieve this gelling by removal of solvent, e.g. by evaporation. The gel time will then depend on the particular solvent employed.

An anisotropic hollow fiber filtration membrane of the invention may be made by: (1) preparing a casing solution comprising a substantially protein non-adsorptive prepolymer, a polymer that will not react readily with the prepolymer, and solvent; (2) spinning said casing solution through a spinneret for hollow fiber production while simultaneously introduction through the central aperture of said spinneret a coagulating liquid with which the protein non-adsorptive prepolymer is polymerizable upon contact and which is a non-solvent for the polymer and prepolymer; and (3) recovering the membrane. Optionally, the casting solution further comprises a pore forming agent. The casting solution is preferably spun through the spinneret at a constant steady pressure, most preferably 1–60 psi. The pressure may be adjusted to achieve the desired flow rate.

The coagulating liquid used in the production of a flat sheet membrane and a hollow fiber membrane of this invention preferably comprises an aqueous solution, more preferably water and optionally contains between 0–25% and more preferably between 3–10% by weight polyamine. The coagulating liquid may alternatively comprise a solvent solution, such as low molecular weight alcohol, and optionally contains between 0–25% and more preferably between 3–10% by weight polyamine. The polyamine, such as diamino polyethylene glycol, is used in order to help the membrane set up faster. When polyamine is included in the coagulating liquid, the pH of the liquid is preferably adjusted to between 7–12 and more preferably between 8–10 by techniques well known in the art, such as by addition of a halogen acid. Preferably, the temperature of the coagulating liquid is between 0° and 100° C. At higher temperatures, the membranes tend to have larger pores. As the membrane casting solution of the invention comes into contact with the coagulation bath or the coagulating liquid from the spinneret, the substantially protein non-adsorptive prepolymer polymerizes and precipitates out and the substantially coagulating liquid-insoluble polymer precipitates out, thus forming a membrane comprising an interpenetrating polymer network of the two polymers. What is meant here by interpenetrating polymer network is an anisotropic membrane structure in which both inner and outer walls have similar chemical identity, that is, a continuous blend of the two polymers throughout the membrane. Preferably, the interpenetrating polymer network comprises acrylonitrile-vinyl chloride and polyethylene glycol urethane urea or polysulfone and polyethylene glycol urethane urea.

In both flat sheet and hollow fiber membrane production, once the membranes are recovered, organic solvents are eliminated, e.g. by washing the membranes with water, and the membranes are then dried by methods commonly used in the art, such as by drying after soaking in a glycerine and water bath.

The invention is further illustrated by the following non-limiting example.

EXAMPLE 1

A hollow fiber membrane of the invention was prepared by dissolving 10 g of Hypol ®3100, a urethane prepolymer obtained from W. R. Grace & Co., in a solution of 17.5 g Kanecaron (an acrylonitrile-vinyl chloride copolymer obtained from Kaneka America Corp), 6.4 g formamide and 67.5 g N-methylpyrolidone. Immediately after preparing the casting solution, the casting solution was degassed in vacuo and then spun through a spinneret for hollow fiber production at a constant steady pressure while simultaneously introducing an aqueous solution containing 5% by weight of Jeffamine, a diamino polyethylene glycol obtained from Texaco, through the central aperture of said spinneret. The hollow fiber was then recovered and dried from a glycerine and water bath. Many hollow fibers were prepared this way, potting in a cartridge and tested for water and protein permeability, as well as various protein rejection values in single solute test. This data is presented in Table 1. Note that all data is generated using the same cartridge.

TABLE 1

FLUX AND REJECTION DATA FOR SINGLE-CARTRIDGE TESTING OF HYPOL ® -KANECARON HOLLOW FIBERS

| Step | Solute of Water Tested | Transmembrane Pressure (mm Hg) | Permeability (X) Minutes (ml/min/m²/mm Hg) | % Rejection ** | Time Of Reading (minutes) |
|---|---|---|---|---|---|
| 1 | Water | 166 | 2.42 | — | 10 |
| 2 | BSA* | 183 | 2.45 | 70 | 30 |
| 3 | Water | 171 | 2.35 | — | 10 |
| 4 | IgG* | 126 | 2.67 | 95 | 30 |
| 5 | Water | 170 | 1.97 | — | 10 |
| 6 | Myoglobin* | 145 | 2.46 | 49 | 30 |
| 7 | Water | 158 | 2.12 | — | 10 |
| 8 | BSA | 172.5 | 3.11 | 75 | 30 |
| 9 | BSA | 257 | 2.74 | 66 | 50' |
|   | BSA | 150 | 3.04 | 79 | 65' |
|   | BSA | 286 | 2.81 | 62 | 80' |
| 10 | Water | 500 | 2.56 | — | 10 |
| 11 | BSA | 616 | 1.9 | 48 | 10 |
|   | BSA | 875 | 1.8 | 42 | 30' |
|   | BSA | 144 | 2.8 | 89 | 45' |

*Myoglobin 17.6K, .04% solution
BSA 67K, .25% solution
IgG 156K, .2% solution $$**\% \text{ Rejection} = \left(1 - \frac{CuF}{Cin}\right) \times 100$$

Normally, polymeric hollow fibers which are subject to fouling would require testing of new cartridges for each data point. The fact that sequential testing was possible with the single cartridge of Table 1 dramatically illustrates the properties and benefits of the non-adsorptive membrane surface.

A further indication of the non-adsorptive nature of the Hypol ®-Kanecaron membrane is given in Table 2. Table 2 shows a comparison of relative protein affinity of the Hypol ®-Kanecaron membrane versus a control fiber prepared from Kanecaron alone.

TABLE 2

Protein Adsorption Onto Hypol ®-Kanecaron Composite Fibers Relative to Control Fibers

| HOLLOW-FIBER SAMPLE | PROTEIN | % BOUND (AV) |
|---|---|---|
| Kanecaron Control | $I^{125}$ Protein A | 80.0 |
| Hypol ®-Kanecaron Composite | $I^{125}$ Protein A | 0.14 |
| Kanecaron Control | $I^{125}$ Insulin | 76.0 |
| Hypol ®-Kanecaron | $I^{125}$ Insulin | 0.97 |

Adsorption of the fiber material was determined by contacting the loose fibers by end-over-end tumbling with $I^{125}$-labelled protein solution (0.1 mg/ml) with a minimum of 20,000 cpm/ml. The % bound was determined by counting the fibers after three washings with PBS (pH=7.0) and taking the ratio of CPM bound to fiber/total CPM applied.

While this invention has been described with reference to its preferred embodiment, other embodiments can achieve the same result. Variations and modifications of the present invention will be obvious to those skilled in the art and it is intended to cover in the appended claims all such modifications and equivalents as fall within the spirit and scope of this invention.

We claim:

1. A self-supported substantially protein non-adsorptive, semipermeable filtration membrane consisting essentially of an interpenetrating polymer network prepared from a casting solution comprising (i) an isocyanate capped urethane prepolymer polymerizable upon contact with a coagulating liquid, (ii) a polymer that will not react readily with the prepolymer and that is substantially insoluble in said coagulating liquid, said polymer selected from the group acrylonitrile-vinyl chloride copolymer, polysulfone and cellulose acetate, and (iii) solvent.

2. The membrane of claim 1 wherein the prepolymer is a substantially protein non-adsorptive prepolymer.

3. The membrane of claim 1 wherein the urethane prepolymer is polymerizable upon contact with water and the polymer is substantially water-insoluble.

4. The membrane of claim 3 wherein the membrane is an anisotropic, hollow fiber membrane.

5. The membrane of claim 4 wherein the membrane is an ultrafiltration membrane.

6. The membrane of claim 4 wherein the casting solution comprises from 5–25% by weight urethane prepolymer and from 5–25% by weight substantially water-insoluble polymer.

7. The membrane of claim 6 wherein the casting solution further comprises 0–10% by weight pore forming agent.

8. The membrane of claim 7 wherein the casting solution comprises from 8–12% by weight urethane prepolymer, from 10–15% by weight substantially water-insoluble polymer, and from 4–6% by weight pore forming agent.

9. The membrane of claim 3 wherein the membrane is an anisotropic flat sheet membrane.

10. The membrane of claim 9 wherein the casting solution comprises from 3–6% by weight urethane prepolymer and from 0–15% by weight substantially water-insoluble polymer.

11. The membrane of claim 3 wherein the substantially water-insoluble polymer comprises acrylonitrile-vinyl chloride copolymer.

12. The membrane of claim 3 wherein the substantially water-insoluble polymer comprises polysulfone.

13. The membrane of claim 1 wherein the membrane is an ultrafiltration membrane.

14. The membrane of claim 1 wherein the membrane is a microfiltration membrane.

15. The membrane of claim 1 wherein the urethane prepolymer comprises an isocyanate capped polyether urethane prepolymer.

16. The membrane of claim 15 wherein the urethane prepolymer comprises a hydrophilic, isocyanate capped polyethylene glycol urethane prepolymer.

17. The membrane of claim 16 wherein the urethane prepolymer has an average isocyanate functionality greater than two.

18. The membrane of claim 1 wherein the solvent is an organic solvent selected from the group consisting of N-Methylpyrrolidinone, N,N dimethylacetamide, acetone, methanol, dimethyl formamide, and 4-hydroxybutyric acid γ-lactone.

19. The membrane of claim 1 wherein the casting solution further comprises a pore forming agent.

20. The membrane of claim 19 wherein the pre forming agent comprises formamide.

21. The membrane of claim 1 wherein the interpenetrating polymer network comprises acrylonitrile-vinyl chloride and polyethylene glycol urethane urea.

22. The membrane of claim 1, wherein the interpenetrating polymer network comprises polysulfone and polyethylene glycol urethane urea.

23. A substantially protein non-adsorptive, anisotropic, semipermeable, hollow fiber ultrafiltration membrane consisting essentially of an interpenetrating polymer network prepared from a casting solution comprising (i) a hydrophilic isocyanate capped polyethylene glycol urethane prepolymer, (ii) a substantially water-insoluble polymer that will not react readily with the prepolymer, said polymer selected from the group acrylonitrile-vinyl chloride copolymer, polysulfone and cellulose acetate, and (iii) solvent.

24. A method for producing a self-supported substantially protein non-adsorptive, semipermeable, anisotropic, filtration membrane consisting essentially of an interpenetrating polymer network which comprises the following steps:
 (a) casting a solution comprising a substantially protein non-adsorptive isocyanate capped urethane prepolymer, a polymer that will not react readily with the prepolymer, said polymer selected from the group acrylonitrile-vinyl chloride copolymer, polysulfone and cellulose acetate, and solvent on a support;
 (b) immersing the supported film in a coagulation bath comprising a coagulating liquid with which the protein non-adsorptive prepolymer is polymerizable upon contact and which is a non-solvent for the polymer and prepolymer; and
 (c) recovering the membrane produced in step b from the support.

25. The method of claim 24 wherein before the supported film is immersed in a coagulation bath in step b, the polymer layer formed on the support in step a is gelled.

26. The method of claim 24 wherein the coagulating liquid is an aqueous liquid.

27. The method of claim 24 wherein in step b, the film is immersed in the coagulation bath for between 5 seconds and 60 minutes and the coagulating liquid has a temperature between about 0° C. and 100° C.

28. The method of claim 24 wherein the isocyanate capped urethane prepolymer comprises a hydrophilic isocyanate capped polyethylene glycol urethane prepolymer.

29. The method of claim 24 wherein in step a, the casting solution further comprises a pore forming agent.

30. A method for producing a substantially protein non-adsorptive, semipermeable, anisotropic, hollow fiber filtration membrane consisting essentially of an interpenetration polymer network which comprises the following steps:
 (a) preparing a casting solution comprising a substantially protein non-adsorptive isocyaate capped urethane prepolymer, a polymer that will not react readily with the prepolymer, said polymer selected from the group acrylonitrile-vinyl chloride copolymer polysulfone and cellulose acetate, and solvent;

(b) spinning said casting solution through a spinneret for hollow fiber production while simultaneously introducing through the central aperture of said spinneret a coagulating liquid with which the protein non-adsorption prepolymer is polymerizable upon contact and which is a non-solvent for the polymer and prepolymer; and (c) recovering the membrane produced in step b.

31. The method of claim 30 wherein in step a, the casting solution further comprises a pore forming agent.

32. The method of claim 30 wherein the isocyanate capped urethane prepolymer comprises a hydrophilic, isocyanate capped polyethylene glycol urethane prepolymer.

33. The method of claim 30 wherein in step b, the casting solution is spun through the spinneret at a constant steady pressure.

34. The method of claim 33 wherein the constant steady pressure ranges from about 1 to 60 psi.

35. The method of claim 30 wherein in the step b, the coagulating liquid introduced through the central aperature is aqueous.

36. The method of claim 35 wherein the coagulating liquid has a temperature between about 0° C. and 100° C.

37. A method for producing a self-supported substantially protein non-adsorptive, semipermeable, anisotropic, filtration membrane consisting essentially of an interpenetrating polymer network, which comprises the following steps:

(a) casting a solution comprising a substantially protein non-adsorptive isocyanate capped urethane prepolymer, a polymer that will not react readily with the prepolymer, said polymer selected from the group acrylonitrile-vinyl chloride copolymer, polysulfone and cellulose acetate, and solvent on a support;

(b) immersing the supported film in a coagulation bath comprising a coagulating liquid with which the protein non-adsorptive prepolymer is polymerizable upon contact, which is a non-solvent for the polymer and prepolymer, and which comprises up to about 25% polyamine; and (c) recovering the membrane produced in step b from the support.

38. The method of claim 37 wherein the interpenetrating polymer network comprises acrylonitrile-vinyl chloride and polyethylene glycol urethane urea.

39. The method of claim 37 wherein the interpenetrating polymer network comprises polysulfone and polyethylene glycol urethane urea.

40. The method of claim 37 wherein the coagulating liquid has a pH of between 7–12.

41. A method for producing a substantially protein non-adsorptive, semipermeable, anisotropic, hollow fiber filtration membrane consisting essentially of an interpenetrating polymer network, which comprises the following steps:

(a) preparing a casting solution comprising a substantially protein non-adsorptive isocyanate capped urethane prepolymer, a polymer that will not react readily with the prepolymer, said polymer selected from the group acrylonitrile-vinyl chloride copolymer, polysulfone and cellulose acetate, and solvent;

(b) spinning said casting solution through a spinneret for hollow fiber production while simultaneously introducing through the central aperture of said spinneret a coagulating liquid with which the protein non-adsorptive prepolymer is polymerizable upon contact, which is a non-solvent for the polymer and prepolymer, and which comprises up to about 25% polyamine; and (c) recovering the membrane produced in step b.

* * * * *

UNITED STATES PATENT AND TRADEMARK OFFICE
CERTIFICATE OF CORRECTION

PATENT NO. : 4,787,976
DATED : November 29, 1988
INVENTOR(S) : Marc E. Parham and Karen E. Milligan It is certified that error appears in the above-identified patent and that said Letters Patent is hereby corrected as shown below:

| | |
|---|---|
| Claim 20, Col. 8, line 5: | "pre" should be --pore--. |
| Claim 30, Col. 8, line 61: | "interpenetration" should be --interpenetrating--. |
| Col. 8, lines 67-68: | "copolymer" should be --copolymer,--. |
| Col. 9, line 5: | "non-adsorption" should be --non-adsorptive--. |

Signed and Sealed this

Fourth Day of April, 1989

Attest:

DONALD J. QUIGG

Attesting Officer

Commissioner of Patents and Trademarks